United States Patent [19]
Takeda et al.

[11] Patent Number: 5,577,765
[45] Date of Patent: Nov. 26, 1996

[54] AIR BAG DEVICE

[75] Inventors: Hideo Takeda, Tokyo; Hiroaki Fujii, Hikone; Takahiro Yamanishi, Hikone; Rika Tokoro, Hikone, all of Japan

[73] Assignee: Takata Corporation, Tokyo, Japan

[21] Appl. No.: 521,734

[22] Filed: Aug. 31, 1995

[30] Foreign Application Priority Data

Sep. 6, 1994 [JP] Japan .................................. 6-238563

[51] Int. Cl.⁶ .................................................. B60R 21/08
[52] U.S. Cl. ...................................... 280/729; 280/743.1
[58] Field of Search ............................... 280/729, 743.1, 280/728.1, 731, 732

[56] References Cited

U.S. PATENT DOCUMENTS

| | | | |
|---|---|---|---|
| Re. 34,204 | 3/1993 | Takada | 280/728.1 |
| 3,586,347 | 6/1971 | Carey | 280/729 |
| 3,752,501 | 8/1973 | Daniel et al. | 280/729 |
| 4,136,894 | 1/1979 | Ono et al. | 280/729 |
| 5,240,283 | 8/1993 | Kishi et al. | 280/743.1 X |
| 5,310,214 | 5/1994 | Cuevas | 280/729 |

*Primary Examiner*—Christopher P. Ellis
*Attorney, Agent, or Firm*—Kanesaka & Takeuchi

[57] ABSTRACT

A container having an inflator is installed to an instrument panel in front of a seat. A rectangular sub bag is mounted to an opening of the container and has a partition panel inside thereof. The partition panel is attached to the sub bag to form first gas communicating paths between the sub bag and the partition panel. A cylindrical main bag has a base portion inserted inside the sub bag and connected to both the sub bag and the partition panel. The main bag has second gas communicating paths communicating to the sub bag disposed between the connection with the sub bag and the connection with the partition panel. Gases spouted from the inflator inflate the sub bag through the first gas communicating paths and then inflate the main bag through the second communicating paths.

6 Claims, 3 Drawing Sheets

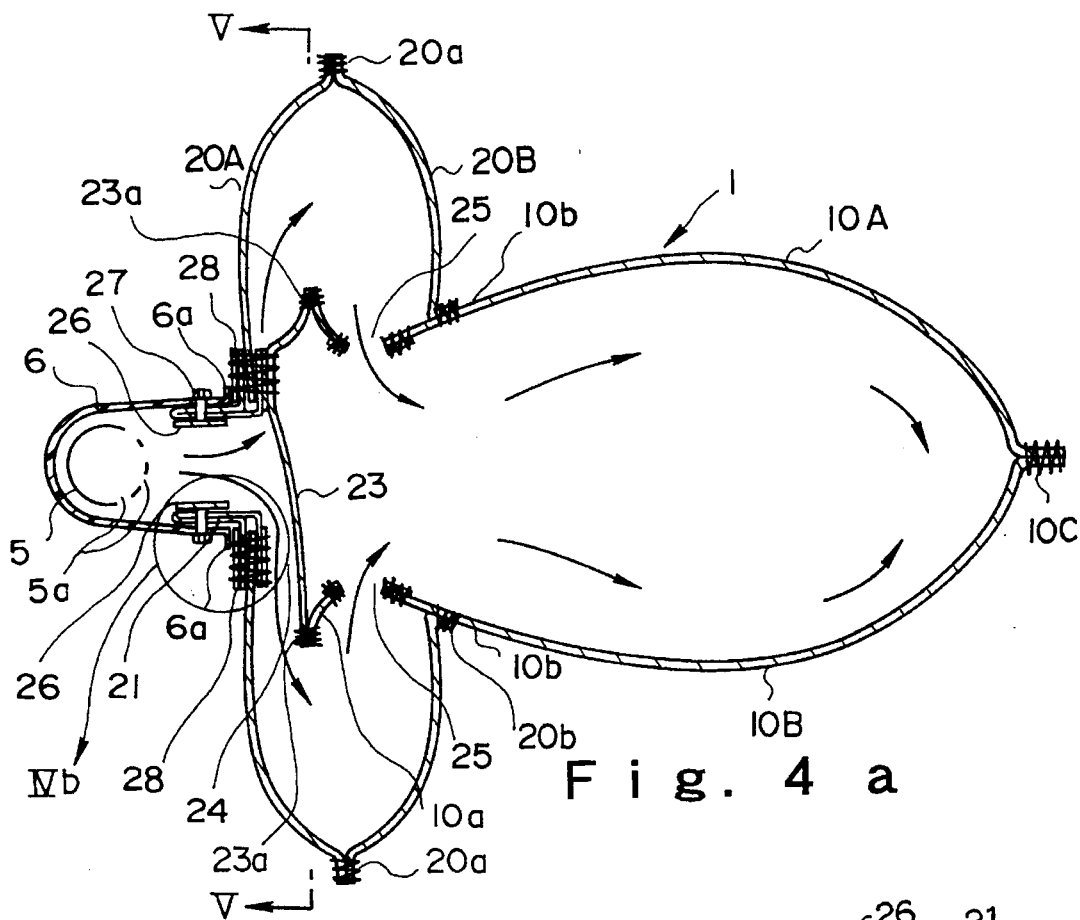
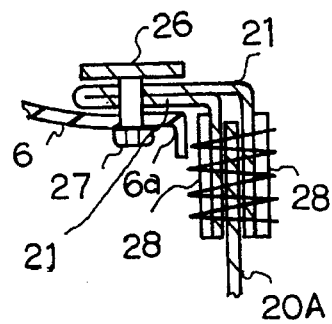
Fig. 4a
Fig. 4b
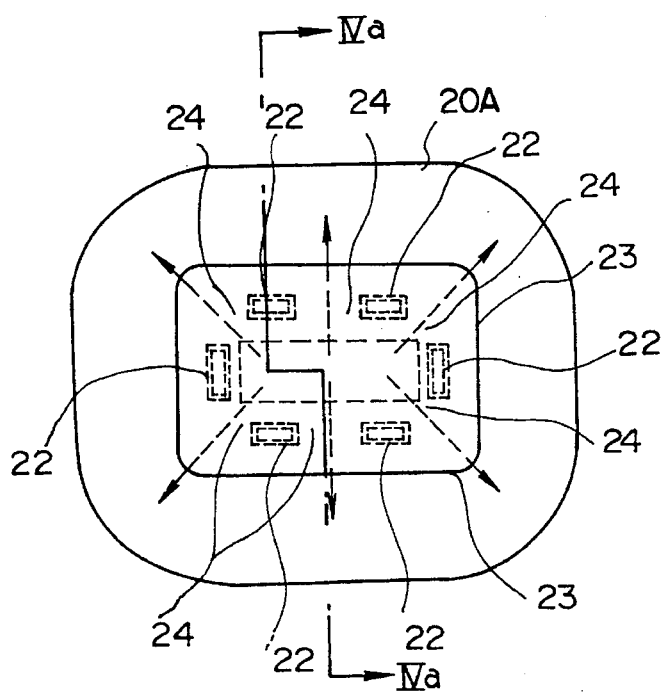
Fig. 5

AIR BAG DEVICE

BACKGROUND OF THE INVENTION

The present invention relates to an air bag device, more particularly, to an air bag device which can securely restrain the knees of an occupant and reliably receive the upper body of the occupant.

The air bag device is a passive restraint system for efficiently protecting an occupant from impact generated at a collision.

When a vehicle comes into collision, the occupant is forced to move forward because of inertial force. As for the air bag device, an air bag filled with gases receives the moving occupant particularly at his/her chest and head. Therefore, the occupant is protected from a secondary collision inside the vehicle.

In case of an air bag device for a driver (hereinafter, referred to as a driver air bag device), an air bag thereof is usually folded and accommodated in a center pad of a steering wheel. In a collision, the air bag is inflated between the steering wheel and the driver, thereby preventing the driver from bumping against the steering wheel.

Recently, an air bag device for protecting an occupant in a passenger seat or a rear seat (hereinafter, referred to as a passenger air bag device) has been also developed for practical use. There is no steering wheel in front of the passenger seat differently from the driver's seat. There is therefore a wide space between the occupant in the passenger seat and an instrument panel. Accordingly, an air bag of the passenger air bag device has a large volume. Conventionally, the volume of the air bag of the passenger air bag device is nearly 2.5 times as much as that of the air bag for the driver air bag device and the passenger air bag device then requires an inflator having a large capacity. FIG. 1 is an explanatory view of a conventional passenger air bag device 50. As shown in FIG. 1, a container 52 in which an air bag is accommodated is installed in the upper portion of an instrument panel 51. The air bag is folded and then accommodated inside the container 52. Reference numeral 50A designates the folded air bag in the accommodated state. The air bag is inflated just in front of an occupant 53 and then occupies a space in front of the upper body of the occupant 53 when the air bag is fully inflated. Reference numeral 50B designate the air bag fully inflated.

However, the air bag 50B cannot restrain the lower body of the occupant as shown in FIG. 1.

Techniques for solving such a problem are disclosed in Japanese Patent Publication No. S57-54337, U.S. Pat. No. 4,265,468 and so on.

An air bag device 60 disclosed in Japanese Patent Publication No. S57-54337 is provided with two air bags, one of which is a torso bag 61 and the other one of which is a knee bag 62, as shown in FIG. 2. When the vehicle comes into collision, the torso bag 61 and the knee bag 62 are simultaneously inflated, with the result that the knee bag 62 restrains the knees of the occupant 53. Therefore, the knee bag 62 prevents the lower body of the occupant 53 from moving forward and the torso bag 61 receives the upper body of the occupant 53.

In the air bag device 60, the two air bags 61 and 62 which have different volumes from each other are simultaneously inflated by only one inflator 64. The knee bag 62 requires an internal pressure higher than that of the torso bag 61. The air bag device 60 has a container which accommodates not only the air bags 61, 62 and the inflator 64 but also an air path supporting plate 65 and a one way valve 66. According to the aforementioned structure, the air bag device 60 provides high pressure gases into the knee bag 62 and provides gases, the pressure of which is suitable for inflating the torso bag 61, into the torso bag 61. Accordingly, the air bag device 60 has a complex structure and the size of the air bag device 60 is increased.

As for an air bag device disclosed in U.S. Pat. No. 4,265,468, a lower cover 55 is mounted on the instrument panel 51 positioned in front of the passenger seat as shown in FIG. 3. An air bag 70 (not shown in the folded state) and an inflator 71 are accommodated inside the lower cover 55. In a collision, the air bag 70 is inflated inside a cabin of the vehicle by opening a lid 75 of the lower cover 55. As mentioned above, the air bag 70 is inflated from a lower position near the knees of the occupant 53, thereby restraining the knees and the upper body of the occupant 53. In addition, the air bag 70 has a knee cushion 73 inside thereof, which securely prevents the lower body of the occupant 53 from moving forward.

In the air bag device disclosed in U.S. Pat. No. 4,265,468, the air bag 70 is inflated inside a cabin of the vehicle by opening a lid 75 of the lower cover 55 positioned in front of the knees of the occupant 53. Accordingly, the air bag 70 requires a large volume to occupy a space between the lower position and the upper position in front of the occupant 53. In addition, to inflate the air bag 70 having such a large volume, the inflator requires a large capacity, thereby making the air bag device expensive.

SUMMARY OF THE INVENTION

An air bag device according to the present invention comprises a container disposed in front of a seat and having an opening, an inflator fixed to the container, and an air bag which is inflated with gases from the inflator, wherein the air bag comprises a first air bag mounted to the opening of the container, a partition panel disposed inside the first air bag, and a second air bag having a base end portion inserted into the first air bag and connected to both the first air bag and the partition panel, the partition panel being attached to the first air bag to have at least one gas communicating path between the first air bag and the partition panel, the second air bag having at least one gas communicating path for communicating to the first air bag disposed between the connection with the first air bag and the connection with the partition panel.

In a preferred embodiment of the air bag device according to the present invention, it is preferable that at least one portion of the first air bag is positioned in front of the knees of an occupant when the air bag is inflated. It is further preferable that the second air bag is inflated toward the chest of the occupant. The second air bag is preferably inflated into a cylindrical shape with its tip rounded. In addition, it is also preferable that the second air bag is provided with a vent hole communicating to the outside disposed near the connection with the first air bag.

According to the present invention, when the air bag is inflated, the movement of the lower body of the occupant can be restrained by the first air bag. In addition, when the upper body of the occupant then bumps against the second air bag, the second air bag receives the upper body of the occupant.

The first air bag is inflated so that one portion thereof is positioned in front of the knees of the occupant, thereby still further securely restraining the lower body of the occupant.

The second air bag is inflated toward the chest of the occupant and inflated into a cylindrical shape with its tip rounded, thereby reducing the volume of the second air bag. In addition, the second air bag is provided with a vent hole communicating to the outside disposed near the connection with the first air bag, thereby effectively absorbing inertial force to the occupant.

BRIEF DESCRIPTION OF THE DRAWINGS

FIG. 4a is a vertical sectional view illustrating an embodiment of an internal structure of an air bag in an air bag device according to the present invention;

FIG. 4b is a fragmentary sectional view, on an enlarged scale, illustrating a portion of the air bag device shown in FIG. 4a;

FIG. 5 is a transverse sectional view illustrating the air bag device, taken along a line V—V shown in FIG. 4a;

DETAILED DESCRIPTION OF THE PREFERRED EMBODIMENTS

Figure 1:
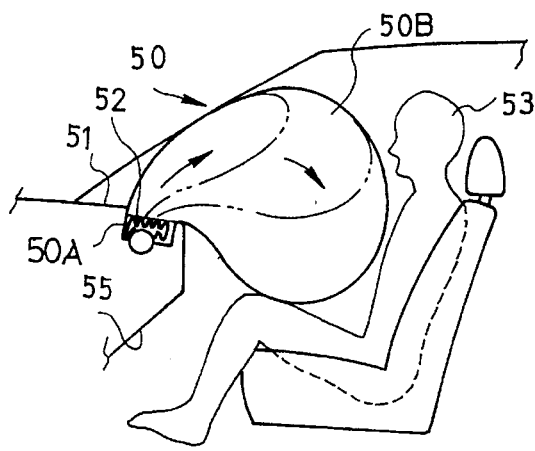
FIG. 1 is a schematic view showing an operational condition of one of conventional air bag devices.
Figure 2:
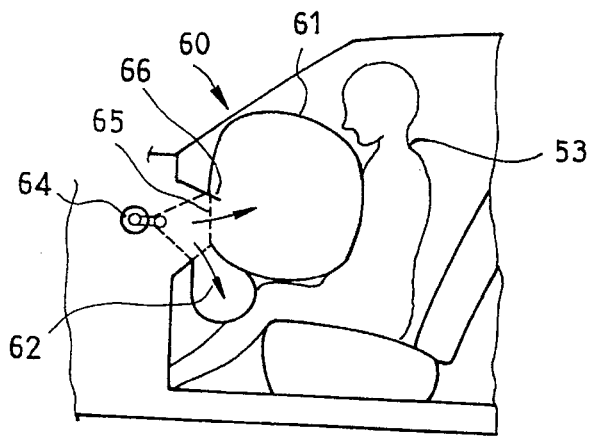
FIG. 2 is a schematic view showing an operational condition of another one of the conventional air bag devices.
Figure 3:
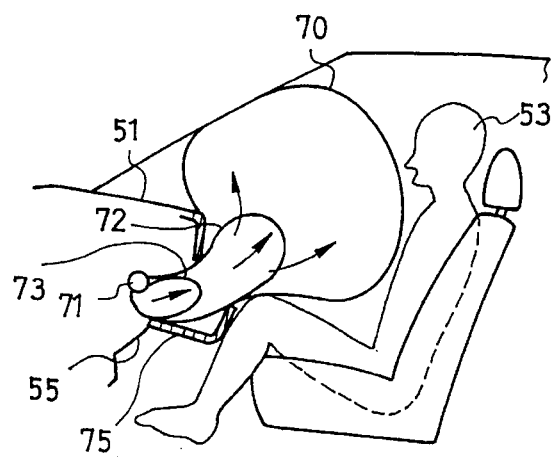
FIG. 3 is a schematic view showing an operational condition of still another one of the conventional air bag devices.

Referring to the drawings, an embodiment of an air bag device according to the present invention will now be described in further detail.

FIG. 4a is a vertical sectional view illustrating a passenger air bag device 1 according to the present invention, taken along a line IVa—IVa shown in FIG. 5, with an air bag thereof inflated fully. FIG. 4b is a fragmentary sectional view, on an enlarged scale, illustrating a portion of the air bag device encircled in FIG. 4a.

Figure 6:
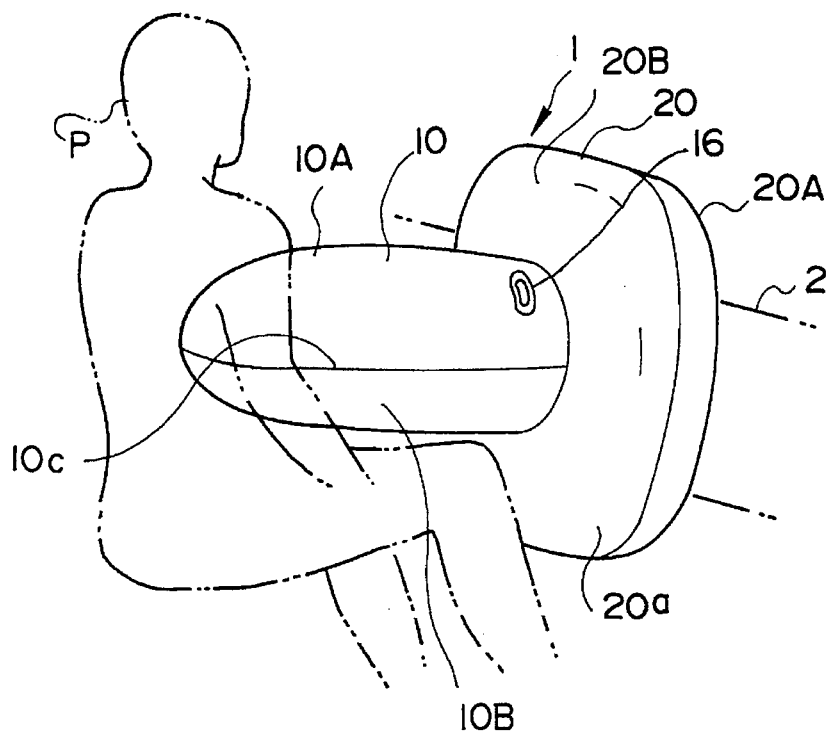
FIG. 6 is a perspective view illustrating the configuration of the air bag inflated fully of the air bag device according to the present invention.

Before explaining the structure of the air bag device 1 according to the present invention, the configuration of an air bag of the air bag device 1 will be described referring to FIG. 6. The air bag is inflated into a configuration as shown in FIG. 6 in front of an occupant P in a passenger seat. The air bag comprises a main bag 10 for receiving the upper body of the occupant P and a sub bag 20 for restraining the knees of the occupant P.

In the following description of the preferred embodiment, the air bag is referred to as the main bag 10 and the sub bag 20. It should be noted that the main bag 10 corresponds to the aforementioned second air bag and the sub bag 20 corresponds to with the aforementioned first air bag. The occupant P is shown with the air bag device in FIG. 6.

The main bag 10 is formed in a cylindrical shape with the tip thereof rounded. The main bag 10 is designed so that the tip becomes close to the chest of the occupant P. Therefore, the chest of the occupant P is securely received by the inflated main bag 10.

The sub bag 20 is formed in a rectangle as it is seen from the occupant P side. The sub bag 20 covers a portion of the instrument panel 2 in front of the occupant P when the sub bag 20 is inflated (see FIG. 6). A lower portion 20a of the sub bag 20 reaches beneath the knees of the occupant P. The knees of the occupant P is securely restrained by the inflated sub bag 20.

Hereinafter, the structure of the air bag device 1 will be described with reference to FIG. 4a and FIG. 4b.

The air bag device 1 according to the present invention comprises a container 6, an inflator 5, and the air bag which comprises the main bag 10, the sub bag 20, and a partition panel 23.

Figure 7:
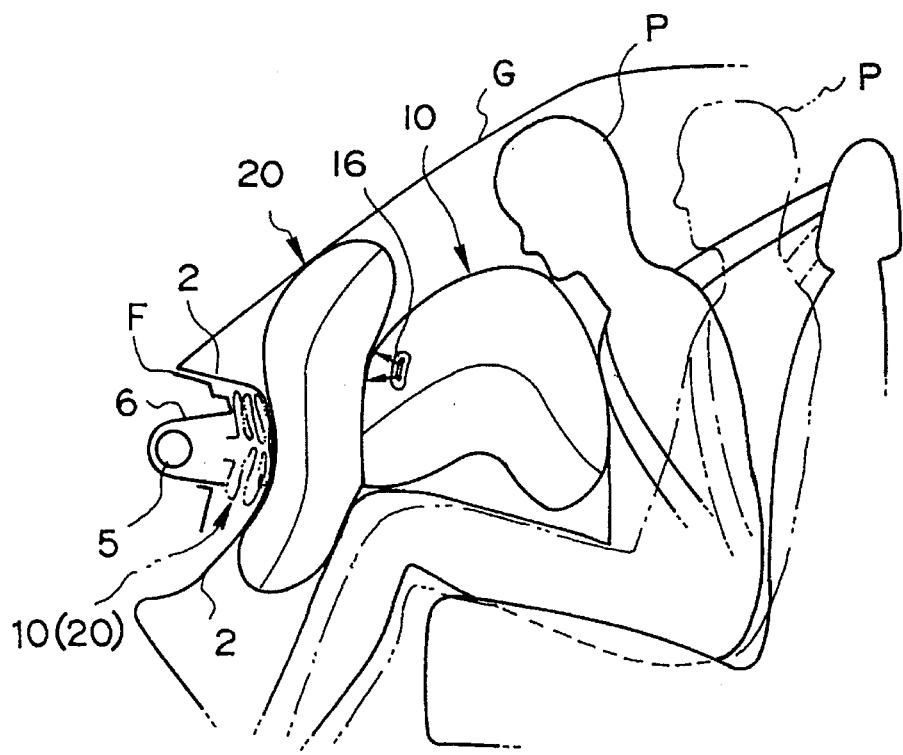
FIG. 7 is an explanatory view showing a mounting condition and an operating condition of the air bag device according to the present invention.

The container 6 is installed in front of the passenger seat and has an opening. The container 6 is fixed to a vehicle frame F in the instrument panel 2 as shown in FIG. 7. The container is made of steel and is formed in a box-like shape, one side of which is opened.

The inflator 5, the configuration of which is cylindrical, is fixed in the container 6. The inflator 5 is provided with a plurality of gas outlets 5a formed in the side surface thereof. The sub bag 20 and the main bag 10 in the folded state are inflated with gases spouted from the gas outlets 5a. The volume of gases spouted by the inflator 5 is less than that of gases spouted by an inflator used in a conventional passenger air bag device.

The sub bag 20 comprises a base panel 20A and a front panel 20B which are sewn together along the peripheries thereof. The two panels are each formed in a rectangle shape, with its corners rounded. Therefore, the configuration of the sub bag 20 inflated fully is a rectangular prism with its corners rounded. The sub bag 20 may not be limited to be formed in this configuration and may be formed in a disk-like shape.

The base panel 20A has an opening in the center thereof. Connecting panels 21 made of cloth are sewn to the base panel 20A all around the opening as shown in FIG. 4b. The sewn portions between the connecting panels 21 and the base panel 20A are reinforced by reinforcing tapes 28. The connecting panels 21 are mounted around the periphery 6a of the opening of the container 6 by using retainer plates 26 and set screws 27. The mounting portion between the connecting panels 21 and the container 6 is air tight.

As mentioned above, one end of the sub bag 20 is mounted to the periphery 6a of the opening of the container 6 in the airtight state.

As shown in FIG. 4a and FIG. 5, in this embodiment, the partition panel 23 is further attached to the base panel 20A by six connections 22. There are six clearances between the base panel 20A and the partition panel 23, each of which is formed between the adjacent connections 22 and 22. Each of the six clearances composes a first gas communicating path 24.

The partition panel 23 is therefore positioned in the sub bag 20.

In the sub bag 20 as structured above, gases spouted from the inflator 5 bump against the partition panel 23 to change the courses to the first gas communicating paths 24 and then pass through the first gas communicating paths 24, respectively, thereby inflating the sub bag 20.

By changing the size and/or the number of the connections 22, the size and/or the number of the first gas communicating paths 24 can be freely set. As a result of this, the sub bag 20 can be inflated at a uniform rate as a whole.

The front panel 20B is sewn to the base panel 20A around the periphery 20a thereof. The front panel 20B is also provided with an opening in the center thereof, into which a base portion of the main bag 10 is inserted. The front panel 20B is sewn to a portion near the edge of the base portion of the main bag 10.

As shown in FIG. 4a, the main bag 10 comprises an upper panel 10A and a lower panel 10B which are sewn together along the periphery 10c thereof except an open end 10a. The main bag 10 is preferably formed in a cylindrical shape with its tip rounded. However, the main bag 10 may be formed in another shape such as a prism and the like. The open end 10a of the main bag 10 is sewn to the periphery 23a of the partition panel 23. The main bag 10 is provided with second gas communicating paths 25 formed in a base or side portion 10b thereof. In this embodiment, the number of the second gas communicating paths 25 is four. The number and/or the area of second gas communicating paths 25 can be suitably set.

The front panel 20B of the sub bag 20 is sewn to the main bag 10 to surround the base portion 10b of the main bag 10 so that the second gas communicating paths 25 are positioned inside the sub bag 20.

According to the structure as mentioned above, gases spouted from the inflator 5 inflate the sub bag 20 and then inflate the main bag 10 through the second gas communicating paths 25 as indicated by arrows in FIG. 4a.

As shown in FIG. 6, the main bag 10 is also provided with vent holes 16 near the connection with the sub bag 20. In this embodiment, the number of the vent holes 16 is two. However the number of the vent holes can be freely set. When the occupant P plunges into the main bag 10, the vent holes 16 operate as gas outlets for discharging gases from the inside of the main bag 10. On the other hand, the sub bag 20 is provided with no vent hole. Therefore, the sub bag 20 is held to be inflated with high internal pressure.

As indicated by a two-dot chain line in FIG. 7, the main bag 10 and the sub bag 20 are usually folded and accommodated in the instrument panel 2 positioned in front of the passenger seat.

In this embodiment, the members such as the main bag 10, the sub bag 20, the connecting panels 21, and the partition panel 23 are made of cloth which is polyamide woven fabric (nylon 66) with a silicone-coated inner surface and are sewn to each other by a thread having about 470 deniers. As a result, the size of the air bag in the folded state can be small, thereby reducing the volume occupied by the air bag in the instrument panel 2. It should be noted that such materials can be freely selected according to the desired specification of the members.

Referring to FIG. 7, the description will now be made as regard to the movement of the occupant P in a collision when the air bag device 1 of the present invention is employed.

First, a sensor (not shown) senses a collision, thereby sending an operational signal from a control circuit (not shown) to the inflator 5. As a result of this, gases are suddenly spouted from the inflator 5. The gases are introduced into the sub bag 20 through the first gas communicating paths 24. Since the sub bag 20 has no vent hole, the sub bag 20 thus inflated is held to have the high internal pressure. Further, the gases are introduced into the main bag 10 through the second gas communicating paths 25, thereby inflating the main bag 10.

In this condition, the sub bag 20 restrains the knees of the occupant P, thereby preventing the lower body of the occupant P from moving forward. The upper body of the occupant P then starts to move forward. The chest of the occupant P moving forward bumps against the main bag 10 so that the occupant P is received by the main bag 10 from moving forward.

At this point, since the vent holes allow the gases in the main bag 10 to escape from the main bag 10, the main bag 10 shrinks absorbs impacts against the occupant P. Therefore, the portion from the chest to the face of the occupant P is protected by the main bag 10.

On the contrary, the sub bag 20 is positioned between the main bag 10 and, the instrument panel 2 and a windshield G, and is held to have the high internal pressure, thereby securely supporting the base portion of the main bag 10 which tends to shrink. Therefore, the main bag 10 mounted to the sub bag 20 can securely catch the occupant P even with a relatively small volume.

What is claimed is:

1. An air bag device comprising:

a container having a first opening;

an inflator fixed to the container for providing gas; and an air bag including a first air bag having a base portion and a front portion located at a side opposite to the base portion, said base portion having a second opening and attached to the container to communicate the first and second openings together, said front portion having a third opening; a partition panel disposed inside the first air bag to cover the second opening and partly connected to the base portion at connecting portions to form a plurality of first paths, each first path being sandwiched between the base portion and the partition panel and located between the connecting portions situated adjacent to each other; and a second air bag projecting outwardly from the first air bag through the third opening of the front portion and having a base end connected to the partition panel, a side portion connected to the front portion of the first air bag around the third opening, a front portion projecting in a direction away from the first air bag, and second paths formed at the side portion inside the first air bag so that when the inflator is actuated, the gas from the inflator enters into the second air bag through the first paths, first air bag and the second paths.

2. An air bag device according to claim 1, wherein said partition panel is formed of a cloth with an outer periphery fixed to the base end of the second air bag.

3. An air bag device according to claim 2, wherein said first air bag has a thickness between the base and front portions of the first air bag and a lateral length extending perpendicular to the thickness when the first air bag is inflated, said thickness of the first air bag being less than the lateral length thereof; and the second air bag has an elongated shape, a longitudinal length extending in a direction as in the thickness of the first air bag and a lateral length perpendicular to the longitudinal length when the second air bag is inflated, the lateral length of the second air bag being less than the longitudinal length of the second air bag and the lateral length of the first air bag.

4. An air bag device according to claim 3, wherein said second air bag includes a vent hole communicating with atmosphere at the side portion near the first air bag, the gas filled in the second air bag being exhausted through the vent hole when the second air bag is pushed.

5. An air bag device according to claim 4, further comprising connecting panels fixed to the base portion around the second opening to connect the first air bag to the container.

6. An air bag device according to claim 5, further comprising an instrument panel in which said container is disposed, said first air bag covering the instrument panel and the second air bag holds an occupant when the air bag is inflated.

\* \* \* \* \*